(12) United States Patent
Suzuki et al.

(10) Patent No.: US 10,670,053 B2
(45) Date of Patent: Jun. 2, 2020

(54) FLUID PRESSURE CYLINDER

(71) Applicant: SMC CORPORATION, Chiyoda-ku (JP)

(72) Inventors: Yasunaga Suzuki, Kasukabe (JP); Chiaki Fukui, Abiko (JP); Makoto Yaegashi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 38 days.

(21) Appl. No.: 15/580,125

(22) PCT Filed: Jun. 1, 2016

(86) PCT No.: PCT/JP2016/002636
§ 371 (c)(1),
(2) Date: Dec. 6, 2017

(87) PCT Pub. No.: WO2016/199374
PCT Pub. Date: Dec. 15, 2016

(65) Prior Publication Data
US 2018/0135662 A1    May 17, 2018

(30) Foreign Application Priority Data
Jun. 11, 2015    (JP) .................................. 2015-118190

(51) Int. Cl.
*F15B 15/28*    (2006.01)
*F15B 15/14*    (2006.01)
*G01D 5/12*    (2006.01)

(52) U.S. Cl.
CPC ...... *F15B 15/1414* (2013.01); *F15B 15/2807* (2013.01); *F15B 15/2861* (2013.01);
(Continued)

(58) Field of Classification Search
CPC .................... F15B 15/1419; F15B 15/2861
See application file for complete search history.

(56) References Cited

U.S. PATENT DOCUMENTS

| 2,616,687 A | 11/1952 | Butterfield |
|---|---|---|
| 3,136,225 A | 6/1964 | Rader |

(Continued)

FOREIGN PATENT DOCUMENTS

| CH | 643 638 A5 | 6/1984 |
|---|---|---|
| CN | 1272167 A | 11/2000 |

(Continued)

OTHER PUBLICATIONS

Japanese Office Action dated Aug. 7, 2018 in Japanese Patent Application No. 2015-118190 (with English translation), 6 pages.
(Continued)

*Primary Examiner* — F Daniel Lopez
(74) *Attorney, Agent, or Firm* — Oblon, McClelland, Maier & Neustadt, L.L.P.

(57) ABSTRACT

In a piston unit of a fluid pressure cylinder a plurality of magnets are disposed through holes provided in a ring body. The magnets are disposed in facing relation to detection sensors that are mounted on connecting rods, and are provided in the same quantity as the connecting rods. Further, a guide rod extending from a head cover to a rod cover is inserted through the interior of the ring body. When the piston unit is displaced along the cylinder tube, rotational displacement is restricted by the piston unit being displaced along the guide rod, whereby the magnets are retained to face toward the connecting rods at all times. Therefore, the position of the piston unit is detected by the detection sensors through the magnets.

7 Claims, 13 Drawing Sheets

(52) U.S. Cl.
CPC ............... *F15B 2211/7054* (2013.01); *F15B 2211/7056* (2013.01); *G01D 5/12* (2013.01)

(56) References Cited

U.S. PATENT DOCUMENTS

| | | | |
|---|---|---|---|
| 3,175,474 | A | 3/1965 | Eickmann |
| 3,655,204 | A | 4/1972 | Sievenpiper |
| 3,835,753 | A | 9/1974 | Bunyard |
| 4,086,456 | A * | 4/1978 | Bone ............... F15B 15/2892 200/294 |
| 4,312,264 | A | 1/1982 | Nunnemacher et al. |
| 4,370,918 | A | 2/1983 | Pringle |
| 4,896,584 | A | 1/1990 | Stoll et al. |
| 5,193,433 | A | 3/1993 | Reimer |
| 5,241,896 | A | 9/1993 | Braun et al. |
| 5,400,696 | A * | 3/1995 | Weber ............... F15B 15/08 92/137 |
| 5,618,142 | A | 4/1997 | Sonden et al. |
| 5,651,631 | A | 7/1997 | Carmien |
| 6,038,959 | A | 3/2000 | Sawada |
| 6,186,484 | B1 | 2/2001 | Noda et al. |
| 6,199,847 | B1 | 3/2001 | Fukui |
| 6,386,088 | B1 | 5/2002 | Yoshimoto et al. |
| 9,038,527 | B2 | 5/2015 | Orihara et al. |
| 9,410,624 | B2 | 8/2016 | George |
| 2004/0107557 | A1 | 6/2004 | Morris et al. |
| 2007/0048156 | A1 | 3/2007 | Chung et al. |
| 2008/0173169 | A1 | 7/2008 | Ikari |
| 2013/0032027 | A1 | 2/2013 | Orihara et al. |
| 2014/0069271 | A1 | 3/2014 | Ishibashi et al. |
| 2014/0076157 | A1 | 3/2014 | Fukui |
| 2014/0157981 | A1 | 6/2014 | Saito et al. |
| 2015/0267723 | A1 | 9/2015 | Kim |
| 2016/0076559 | A1 | 3/2016 | Nomura |
| 2016/0084220 | A1 | 3/2016 | Moeller et al. |
| 2017/0191507 | A1 | 7/2017 | Marinoni et al. |

FOREIGN PATENT DOCUMENTS

| | | |
|---|---|---|
| CN | 201170227 Y | 12/2008 |
| CN | 201599273 U | 10/2010 |
| CN | 103562567 A | 2/2014 |
| DE | 81 24 287 U1 | 12/1961 |
| DE | 199 25 600 A1 | 12/2000 |
| DE | 101 41 560 A1 | 3/2003 |
| DE | 10 2009 020 286 A1 | 11/2010 |
| EP | 0 190 528 A1 | 8/1986 |
| EP | 1 001 174 A1 | 5/2000 |
| EP | 2716 920 A1 | 4/2014 |
| FR | 2 575 527 A1 | 7/1986 |
| JP | 48-14117 Y1 | 4/1973 |
| JP | 50-152085 | 12/1975 |
| JP | 52-27972 | 3/1977 |
| JP | 52-125985 A | 10/1977 |
| JP | 56-5605 Y1 | 2/1981 |
| JP | 56-115010 U | 9/1981 |
| JP | 59-1493 U | 1/1984 |
| JP | 62-107103 U | 7/1987 |
| JP | 63-111303 A | 5/1988 |
| JP | 5-6204 U | 1/1993 |
| JP | 5-59212 U | 8/1993 |
| JP | 11-37112 A | 2/1999 |
| JP | 11-62910 A | 3/1999 |
| JP | 11-132204 A | 5/1999 |
| JP | 11-153104 A | 6/1999 |
| JP | 2000-074007 A | 3/2000 |
| JP | 2005-54977 A | 3/2005 |
| JP | 2007-16916 A | 1/2007 |
| JP | 2008-133920 A | 6/2008 |
| JP | 2012-57770 A | 3/2012 |
| JP | 2014-219038 A | 11/2014 |
| KR | 10-2014-0034198 A | 3/2014 |
| KR | 10-2014-0074845 A | 6/2014 |
| TW | M495452 U | 2/2015 |
| WO | WO 2012/161159 A1 | 11/2012 |
| WO | WO 2013/026508 A1 | 2/2013 |

OTHER PUBLICATIONS

Japanese Office Action dated Aug. 7, 2018 in Japanese Patent Application No. 2015-118174 (with English translation), 9 pages.
Office Action dated Jan. 9, 2018 in Japanese Patent Application No. 2015-118174 (with English language translation).
Office Action dated Jan. 9, 2018 in Japanese Patent Application No. 2015-118182 (with English language translation).
Office Action dated Jan. 9, 2018 in Japanese Patent Application No. 2015-118190 (with English language translation).
Office Action dated Mar. 18, 2019 in Korean Patent Application No. 10-2018-7000911, 8 pages (with unedited computer generated English translation).
Office Action dated Mar. 18, 2019 in Korean Patent Application No. 10-2018-7000913, 7 pages (with unedited computer generated English translation).
Office Action dated Mar. 18, 2019 in Korean Patent Application No. 10-2018-7000915, 7 pages (with unedited computer generated English translation).
Combined Chinese Office Action and Search Report dated Jan. 11, 2019 in Chinese Patent Application No. 201680033247.0 (with English translation), 12 pages.
Combined Chinese Office Action and Search Report dated Dec. 26, 2018 in Chinese Patent Application No. 201680033635.9 (with English translation), 12 pages.
Combined Chinese Office Action and Search Report dated Dec. 27, 2018 in Chinese Patent Application No. 201680033652.2 (with English translation), 16 pages.
Combined Chinese Office Action and Search Report dated Jan. 16, 2019 in Chinese Patent Application No. 201680033671.5 (with English translation), 17 pages.
International Search Report and Written Opinion dated Sep. 28, 2016, in PCT/JP2016/002636 filed Jun. 1, 2016.
Office Action dated May 14, 2019 in co-pending U.S. Appl. No. 15/580,109, 10 pages.
Office Action dated Jun. 3, 2019 in co-pending U.S. Appl. No. 15/580,106, 11 pages.
Office Action dated Jun. 10, 2019 in co-pending U.S. Appl. No. 15/580,124, 12 pages.
Office Action dated May 21, 2019 in co-pending U.S. Appl. No. 15/580,133, 15 pages.
U.S. Appl. No. 15/580,098, filed Dec. 6, 2017, Yasunaga Suzuki, et al.
U.S. Appl. No. 15/580,109, filed Dec. 6, 2017, Yasunaga Suzuki, et al.
U.S. Appl. No. 15/580,106, filed Dec. 6, 2017, Yasunaga Suzuki, et al.
U.S. Appl. No. 15/580,133, filed Dec. 6, 2017, Yasunaga Suzuki, et al.
U.S. Appl. No. 15/580,124, filed Dec. 6, 2017, Yasunaga Suzuki, et al.
Korean Office Action dated Aug. 5, 2019 in Korean Patent Application No. 10-2018-7000911 (with unedited computer generated English translation), 9 pages.
Combined Chinese Office Action and Search Report dated Aug. 14, 2019 in Chinese Patent Application No. 201680033045.6 (with English translation), 17 pages.
Office Action dated Aug. 8, 2019 in co-pending U.S. Appl. No. 15/580,098, 14 pages.
Office Action dated Jan. 1, 2020 issued in Indian Patent Application No. 201847000221 w/English Translation. 5 Pages.

* cited by examiner

FLUID PRESSURE CYLINDER

TECHNICAL FIELD

The present invention relates to a fluid pressure cylinder that displaces a piston in an axial direction under the supply of a pressure fluid.

BACKGROUND ART

Conventionally, as a transport means for a workpiece or the like, for example, a fluid pressure cylinder having a piston that is displaced under the supply of a pressure fluid has been used. The present applicant has proposed a fluid pressure cylinder, as disclosed in Japanese Laid-Open Patent Publication No. 2008-133920, which is closed on both ends by a head cover and a rod cover, and in which the head cover and the rod cover are tightly fastened together with the cylinder tube by four connecting rods.

With this type of fluid pressure cylinder, a piston and a piston rod are disposed for displacement in the interior of the cylinder tube, and by supplying a pressure fluid into cylinder chambers that are formed between the piston and the cylinder tube, the piston is displaced along the axial directions.

SUMMARY OF INVENTION

A general object of the present invention is to provide a fluid pressure cylinder, which is capable of reducing manufacturing costs along with realizing a reduction in weight.

The present invention is characterized by a fluid pressure cylinder comprising a cylinder tube including cylinder chambers defined in interior thereof, cover members attached to ends of the cylinder tube, and a piston disposed displaceably along the cylinder chambers, the fluid pressure cylinder further comprising:

a magnetic body disposed at a predetermined location along a circumferential direction of the piston; and a rotation restricting member configured to restrict rotational displacement of the piston;

wherein the magnetic body is disposed at a position facing toward a detection sensor that is arranged along a circumferential surface of the cylinder tube.

According to the present invention, in the piston that constitutes the fluid pressure cylinder, the magnetic body is disposed at a predetermined position along the circumferential direction thereof, and the magnetic body is disposed at a position facing toward the detection sensor that is arranged along the circumferential surface of the cylinder tube, and together therewith, rotational displacement of the piston is restricted by the rotation restricting member.

Consequently, by reliably restricting rotational displacement of the piston by the rotation restricting member, the magnetic body, which is disposed at a predetermined position on the piston, is kept at all times at a position facing toward the detection sensor, and the position of the piston can reliably be detected by the detection sensor and the magnetic body. Therefore, there is no need to provide a ring shaped magnetic body along the outer circumferential surface of the piston, as in the conventional fluid pressure cylinder, and the amount of the magnetic body that is used can be reduced. As a result, while manufacturing costs for the fluid pressure cylinder are reduced, it also is possible to reduce the weight of the fluid pressure cylinder.

The above and other objects, features and advantages of the present invention will become more apparent from the following description when taken in conjunction with the accompanying drawings, in which a preferred embodiment of the present invention is shown by way of illustrative example.

DESCRIPTION OF EMBODIMENTS

Figure 1:
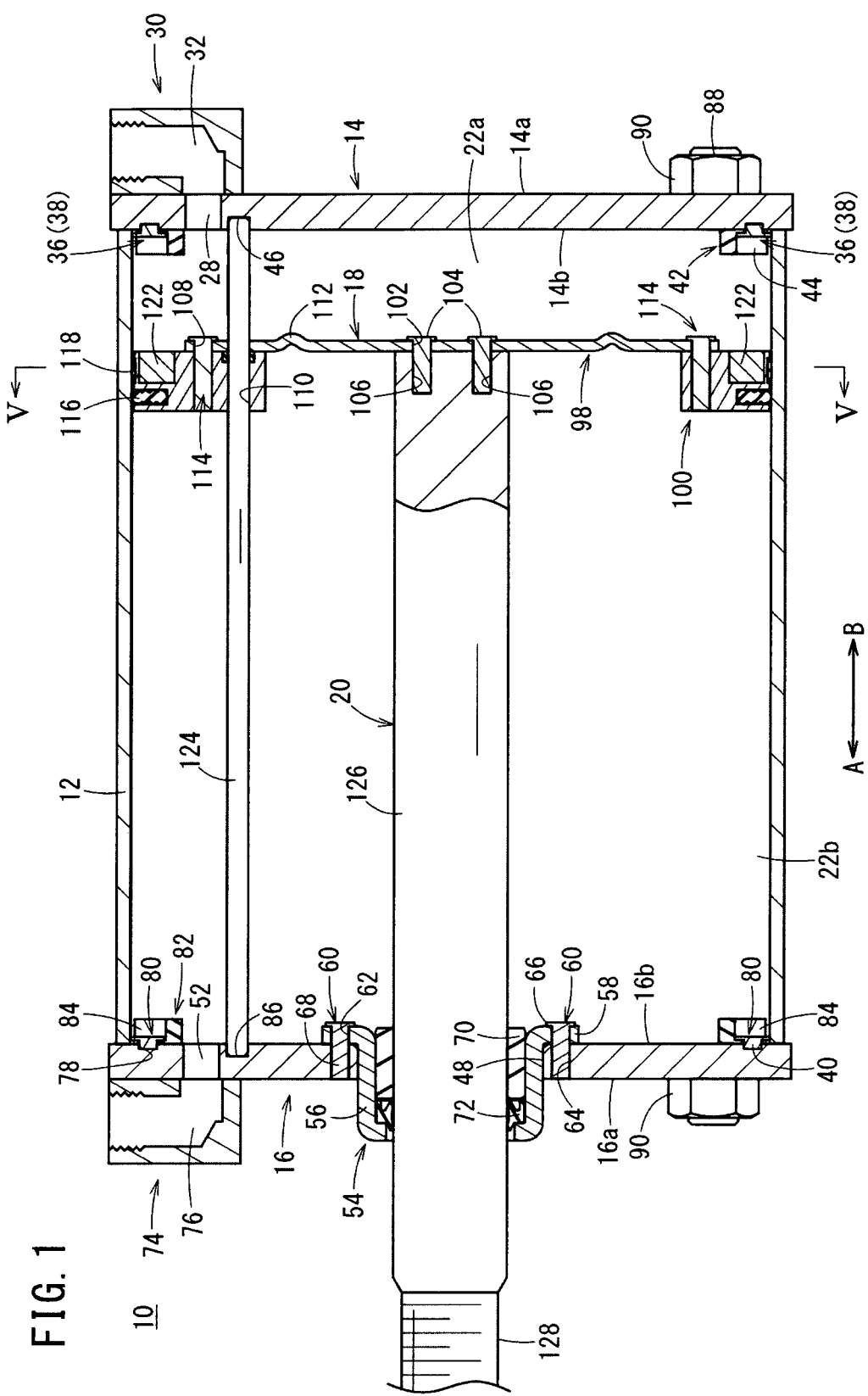
FIG. 1 is an overall cross-sectional view of a fluid pressure cylinder according to a first embodiment of the present invention.

As shown in FIG. 1, a fluid pressure cylinder 10 includes a tubular shaped cylinder tube 12, a head cover (cover member) 14 that is mounted on one end of the cylinder tube 12, a rod cover (cover member) 16 that is mounted on another end of the cylinder tube 12, a piston unit (piston) 18 that is disposed for displacement in the interior of the cylinder tube 12, and a piston rod 20 that is connected to the piston unit 18.

The cylinder tube 12, for example, is constituted from a cylindrical body that is formed from a metal material, and extends with a constant cross-sectional area along the axial direction (the directions of arrows A and B), and the interior chamber thereof accommodates the piston unit 18. The piston unit 18 divides the interior chamber to form cylinder chambers 22a, 22b. Further, on both ends of the cylinder tube 12, ring shaped seal members (not shown) are installed respectively through annular grooves.

As shown in FIGS. 1 through 3A and 4A, the head cover 14, for example, is a plate body that is formed with a substantially rectangular shape in cross section from a metal material, which is provided to cover one end of the cylinder tube 12. At this time, by the seal member (not shown), which is disposed on the end of the cylinder tube 12, abutting against the head cover 14, a pressure fluid is prevented from leaking out from the cylinder chamber 22a through a gap between the cylinder tube 12 and the head cover 14.

Figure 4A:
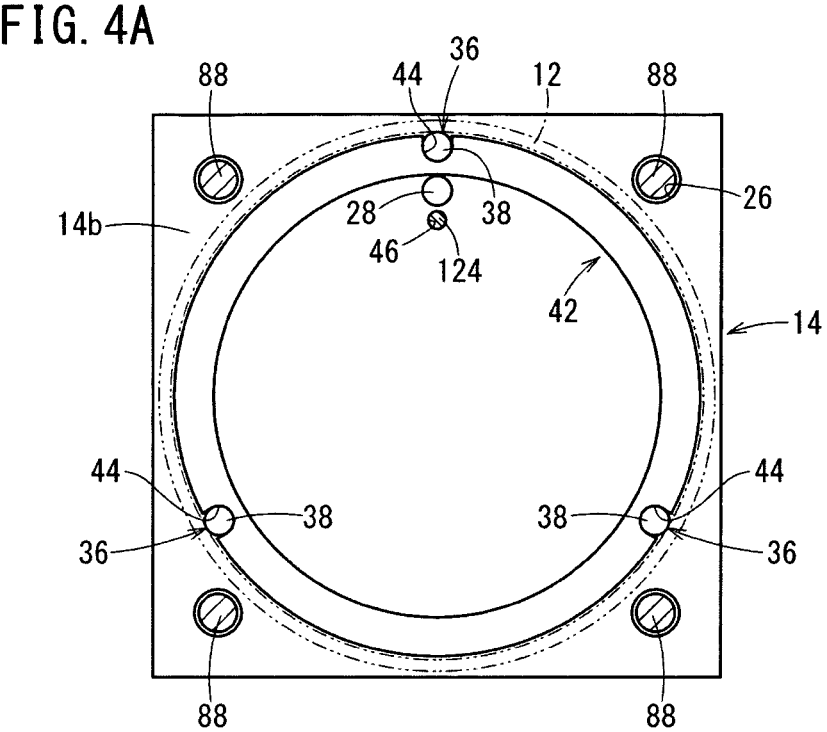
FIG. 4A is a front view shown partially in cross section of the head cover of FIG. 3A as seen from a side of the cylinder tube.

Further, as shown in FIG. 4A, in the vicinity of the four corners of the head cover 14, four first holes 26 are formed, respectively, through which later-described connecting rods 88 are inserted. A first communication hole 28 is formed at a position on a central side of the head cover 14 with respect to the first holes 26. The first holes 26 and the first communication hole 28 penetrate respectively in a thickness direction (the directions of arrows A and B) of the head cover 14 shown in FIGS. 1 and 2.

A first port member 30 from which the pressure fluid is supplied and discharged is provided on an outer wall surface 14a of the head cover 14, to which a pressure fluid supply source is connected through a non-illustrated pipe. The first port member 30, for example, is constituted from a block body, which is formed from a metal material, and is fixed by welding or the like.

Further, in the interior of the first port member 30, a port passage 32, which is formed with an L-shape in cross-section, is formed, and an opening thereof is fixed with respect to the outer wall surface 14a of the head cover 14 in a state of being opened in a direction perpendicular to the axial direction of the cylinder tube 12.

In addition, by the port passage 32 of the first port member 30 communicating with the first communication hole 28 of the head cover 14, the first port member 30 and the interior of the cylinder tube 12 are placed in communication.

Instead of providing the first port member 30, for example, a pipe connection fitting may be connected directly with respect to the first communication hole 28.

Figure 2:
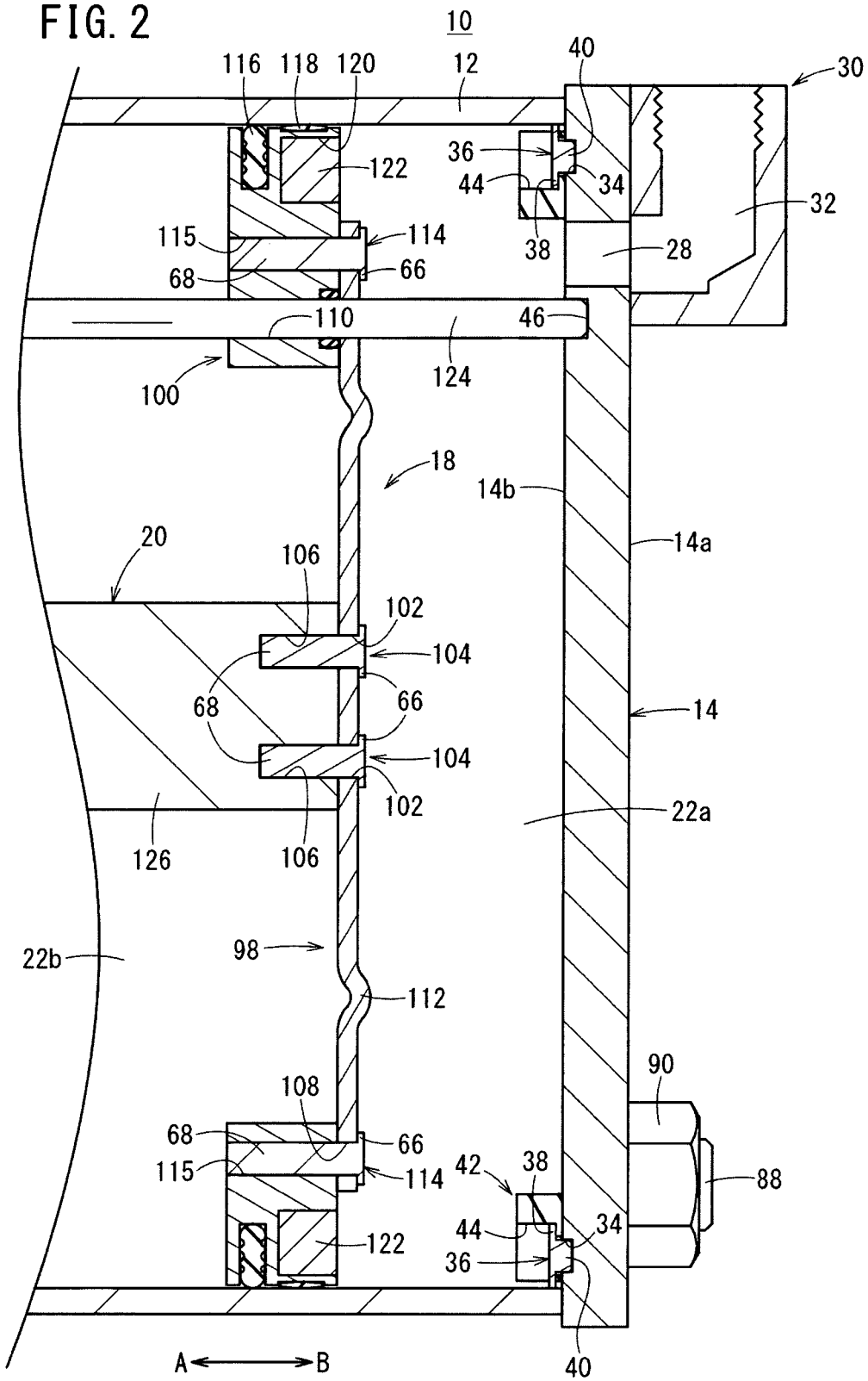
FIG. 2 is an enlarged cross-sectional view of the vicinity of a piston unit in the fluid pressure cylinder of FIG. 1.

On the other hand, on an inner wall surface 14b of the head cover 14 formed on a side of the cylinder tube 12 (in the direction of the arrow A), as shown in FIGS. 1, 2 and 4A, a plurality of (for example, three) first pin holes 34 are formed on a circumference that is smaller in diameter than the inner circumferential diameter of the cylinder tube 12, and first spigot pins 36 are inserted respectively into the first pin holes 34. The first pin holes 34 are formed on a circumference having a predetermined diameter with respect to the center of the head cover 14, and are separated by equal intervals mutually along the circumferential direction.

The first spigot pins 36 are disposed in a plurality so as to be of the same number as the first pin holes 34, and are made up from flange members 38 formed with circular shapes in cross section, and shaft members 40 of a smaller diameter than the flange members 38 which are inserted into the first pin holes 34. In addition, by press-fitting of the shaft members 40 of the first spigot pins 36 into the first pin holes 34, the first spigot pins 36 are fixed, respectively, to the inner wall surface 14b of the head cover 14, and the flange members 38 thereof are in a state of projecting out with respect to the inner wall surface 14b of the head cover 14.

Further, when the cylinder tube 12 is assembled with respect to the head cover 14, as shown in FIG. 4A, the outer circumferential surfaces of the flange members 38 of the first spigot pins 36 come into internal contact with, i.e., inscribe, respectively, the inner circumferential surface of the cylinder tube 12, whereby the cylinder tube 12 is positioned with respect to the head cover 14. More specifically, the plural first spigot pins 36 function as positioning means for positioning the one end of the cylinder tube 12 with respect to the head cover 14.

Stated otherwise, the first spigot pins 36 are arranged on a circumference having a predetermined diameter so that the outer circumferential surfaces thereof internally contact or inscribe the inner circumferential surface of the cylinder tube 12.

A ring shaped first damper 42 is disposed on the inner wall surface 14b of the head cover 14. The first damper 42, for example as shown in FIG. 4A, is formed with a predetermined thickness from a resilient material such as rubber or the like, and the inner circumferential surface thereof is arranged more radially outward than the first communication hole 28 (see FIGS. 2 and 4A).

Further, in the first damper 42, plural cutaway sections 44 are included, which are recessed with substantially circular shapes in cross section radially inward from the outer circumferential surface of the first damper 42, and the first spigot pins 36 are inserted through the cutaway sections 44. More specifically, the cutaway sections 44 are provided in the same number, at the same pitch, and on the same circumference as the first spigot pins 36. In addition, as shown in FIG. 2, by the first damper 42 being sandwiched between the inner wall surface 14b of the head cover 14 and the flange members 38 of the first spigot pins 36, the first damper 42 is retained in a state of projecting out at a predetermined height with respect to the inner wall surface 14b.

More specifically, at the same time as functioning as positioning means (spigot means) for positioning the one end of the cylinder tube 12 at a predetermined position with respect to the head cover 14, the first spigot pins 36 also function as fixing means for fixing the first damper 42 to the head cover 14.

In addition, when the piston unit 18 is displaced to the side of the head cover 14 (in the direction of the arrow B), by the end thereof coming into abutment against the first damper 42, direct contact between the piston unit 18 and the head cover 14 is avoided, and the occurrence of shocks and impact noises accompanying such contact is suitably prevented.

Further, a first rod hole 46 in which a later-described guide rod (rod) 124 is supported is formed in the head cover 14 at a position located further toward the central side with respect to the first communication hole 28. The first rod hole 46 opens toward the side of the inner wall surface 14b of the head cover 14 (in the direction of the arrow A) and does not penetrate through to the outer wall surface 14a.

Figure 3A:
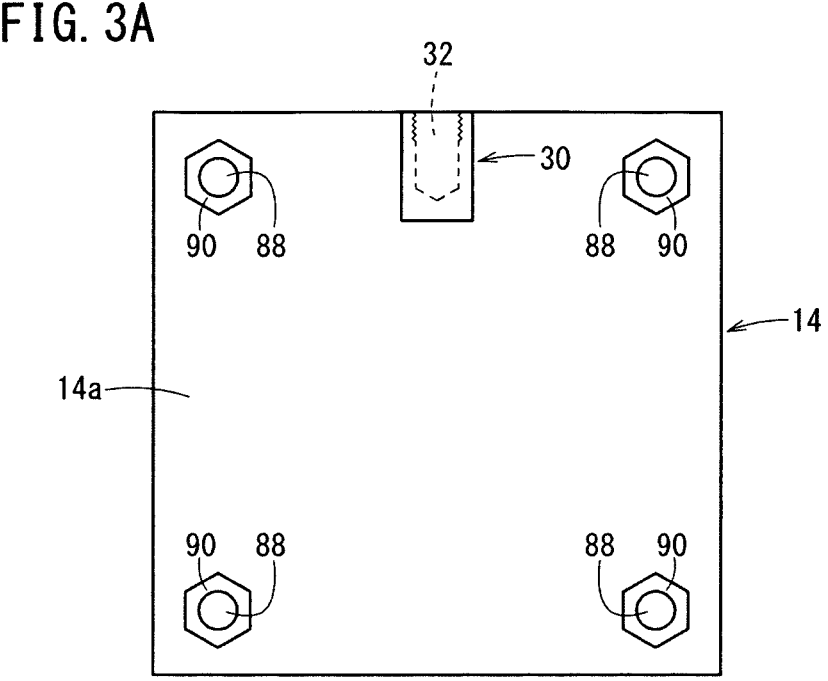
FIG. 3A is a front view as seen from a side of a head cover in the fluid pressure cylinder of FIG. 1.
Figure 3B:
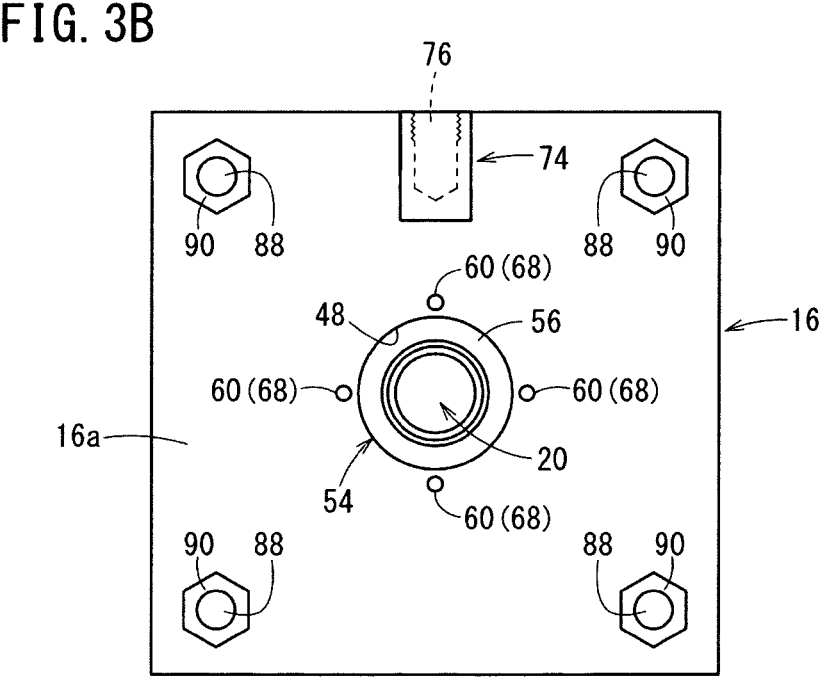
FIG. 3B is a front view as seen from a side of a rod cover in the fluid pressure cylinder of FIG. 1.
Figure 4B:
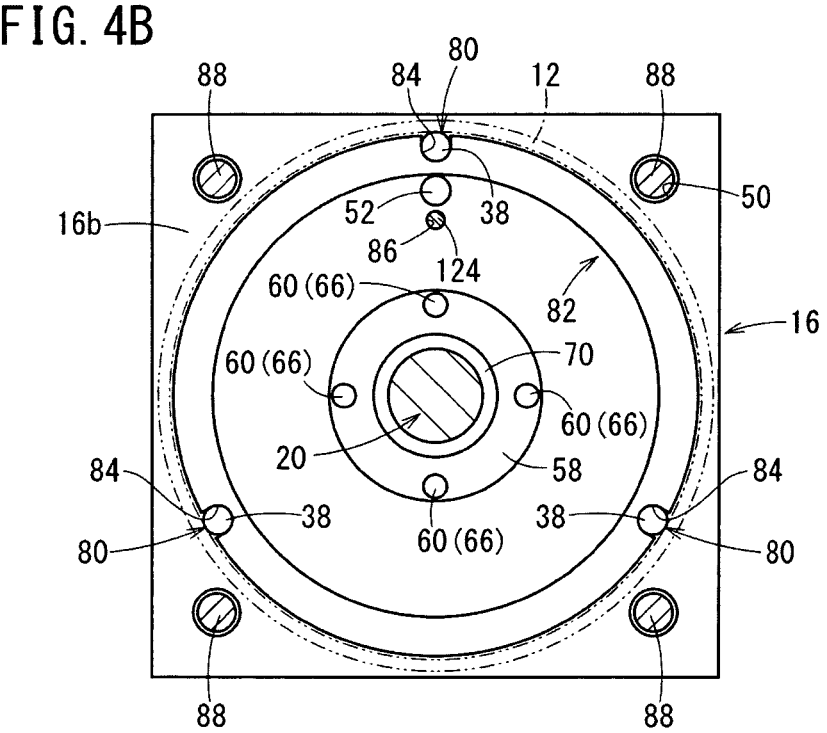
FIG. 4B is a front view shown partially in cross section of the rod cover of FIG. 3B as seen from a side of the cylinder tube.

As shown in FIGS. 1, 3B and 4B, the rod cover 16, in the same manner as the head cover 14, for example, is a plate body that is formed with a substantially rectangular shape in cross section from a metal material, which is provided to cover the other end of the cylinder tube 12. At this time, by the seal member (not shown), which is disposed on the end of the cylinder tube 12, abutting against the rod cover 16, the pressure fluid is prevented from leaking out from the cylinder chamber 22b through a gap between the cylinder tube 12 and the rod cover 16.

A rod hole 48 is formed to penetrate in an axial direction (the directions of arrows A and B) through the center of the rod cover 16, and four second holes 50 through which the later-described connecting rods 88 are inserted are formed in the four corners of the rod cover 16. Further, a second communication hole 52 is formed in the rod cover 16 at a position located on the central side with respect to the second holes 50. The rod hole 48, the second holes 50, and the second communication hole 52 are formed to penetrate respectively in the thickness direction (the directions of arrows A and B) through the rod cover 16.

A holder (rod holder) 54 that displaceably supports the piston rod 20 is provided in the rod hole 48. As shown in FIG. 1, for example, the holder 54 is formed by a drawing process or the like from a metal material, and includes a cylindrical holder main body 56, and a flange member 58 formed on one end of the holder main body 56 and which is expanded radially outward in diameter. A portion of the holder main body 56 is disposed so as to project outside from the rod cover 16.

In addition, in a state in which the holder main body 56 is inserted through the rod hole 48 of the rod cover 16, and the flange member 58 is arranged on the side of the cylinder tube 12 (in the direction of the arrow B), the flange member 58 abuts against an inner wall surface 16b of the rod cover 16, and a plurality of (for example, four) first rivets 60 are inserted into and made to engage with first rivet holes 64 of the rod cover 16 via first through holes 62 of the flange member 58. As a result, the holder 54 is fixed with respect to the rod hole 48 of the rod cover 16. At this time, the holder 54 is fixed coaxially with the rod hole 48.

The first rivets 60, for example, are self-drilling or self-piercing rivets each having a circular flange member 66, and a shaft-shaped pin member 68 that is reduced in diameter with respect to the flange member 66. In a state with the first rivets 60 being inserted into the first through holes 62 from the side of the flange member 58, and the flange members 66 thereof engaging with the flange member 58, by punching the pin members 68 into the first rivet holes 64 of the rod cover 16, the pin members 68 are engaged with respect to the first through holes 62, and the flange member 58 is fixed with respect to the rod cover 16.

The first rivets 60 are not limited to being self-drilling rivets, and for example, may be general rivets that are fixed by having the pin members 68 thereof crushed and deformed after having been pushed out to the side of an outer wall surface 16a of the rod cover 16.

A bush 70 and a rod packing 72 are disposed alongside one another in the axial direction (the directions of arrows A and B) in the interior of the holder 54, and by the later-described piston rod 20 being inserted through the interior portion thereof, simultaneously with the piston rod 20 being guided along the axial direction by the bush 70, the rod packing 72 slides in contact therewith, whereby leakage of pressure fluid through a gap between the holder 54 and the rod packing 72 is prevented.

As shown in FIGS. 1 and 3B, a second port member 74 from which the pressure fluid is supplied and discharged is provided on the outer wall surface 16a of the rod cover 16, to which a pressure fluid supply source is connected through a non-illustrated pipe. The second port member 74, for example, is constituted from a block body, which is formed from a metal material, and is fixed by welding or the like.

Further, in the interior of the second port member 74, a port passage 76, which is formed with an L-shape in cross-section, is formed, and an opening thereof is fixed with respect to the outer wall surface 16a of the rod cover 16 in a state of being opened in a direction perpendicular to the axial direction of the cylinder tube 12.

In addition, by the port passage 76 of the second port member 74 communicating with the second communication hole 52 of the rod cover 16, the second port member 74 and the interior of the cylinder tube 12 are placed in communication.

Instead of providing the second port member 74, for example, a pipe connection fitting may be connected directly with respect to the second communication hole 52.

On the other hand, on the inner wall surface 16b of the rod cover 16 that is formed on a side of the cylinder tube 12 (in the direction of the arrow B), as shown in FIGS. 1 and 4B, a plurality of (for example, three) second pin holes 78 are formed on a circumference that is smaller in diameter than the inner circumferential diameter of the cylinder tube 12, and second spigot pins 80 are inserted respectively into the second pin holes 78. More specifically, the second spigot pins 80 are provided in plurality in the same number as the second pin holes 78.

The second pin holes 78 are formed on a circumference having a predetermined diameter with respect to the center of the rod cover 16, and are separated by equal intervals mutually along the circumferential direction. The second spigot pins 80 are formed in the same shape as the first spigot pins 36, and therefore, detailed description thereof is omitted.

In addition, by insertion of the shaft members 40 of the second spigot pins 80 into the second pin holes 78, the second spigot pins 80 are fixed, respectively, to the inner wall surface 16b of the rod cover 16, and the flange members 38 thereof are in a state of projecting out with respect to the inner wall surface 16b of the rod cover 16.

Further, when the cylinder tube 12 is assembled with respect to the rod cover 16, as shown in FIG. 4B, the outer circumferential surfaces of the flange members 38 of the second spigot pins 80 come into internal contact with, i.e., inscribe, respectively, the inner circumferential surface of the cylinder tube 12, whereby the cylinder tube 12 is positioned with respect to the rod cover 16. More specifically, the plural second spigot pins 80 function as positioning means for positioning the other end of the cylinder tube 12 with respect to the rod cover 16.

Stated otherwise, the second spigot pins 80 are arranged on a circumference having a predetermined diameter so that the outer circumferential surfaces thereof internally contact or inscribe the inner circumferential surface of the cylinder tube 12.

A ring shaped second damper 82 is disposed on the inner wall surface 16b of the rod cover 16. The second damper 82, for example as shown in FIG. 4B, is formed with a predetermined thickness from a resilient material, for example, such as rubber or the like, and the inner circumferential surface thereof is arranged more radially outward than the second communication hole 52.

Further, in the second damper 82, plural cutaway sections 84 are included, which are recessed with substantially circular shapes in cross section radially outward from the outer circumferential surface of the second damper 82, and the second spigot pins 80 are inserted through the cutaway sections 84. In addition, by the second damper 82 being sandwiched between the inner wall surface 16b of the rod cover 16 and the flange members 38 of the second spigot pins 80, the second damper 82 is retained in a state of projecting out at a predetermined height with respect to the inner wall surface 16b.

More specifically, the cutaway sections 84 are provided in the same number, at the same pitch, and on the same circumference as the second spigot pins 80.

In this manner, at the same time as functioning as positioning means (spigot means) for positioning the other end of the cylinder tube 12 at a predetermined position with respect to the rod cover 16, the second spigot pins 80 also function as fixing means for fixing the second damper 82 to the rod cover 16.

In addition, when the piston unit 18 is displaced to the side of the rod cover 16 (in the direction of the arrow A), by the end thereof coming into abutment against the second damper 82, direct contact between the piston unit 18 and the rod cover 16 is avoided, and the occurrence of shocks and impact noises accompanying such contact is suitably prevented.

Further, a second rod hole 86 in which the later-described guide rod 124 is supported is formed at a position located further toward the central side of the rod cover 16 with respect to the second communication hole 52. As shown in FIG. 1, the second rod hole 86 opens toward the side of the inner wall surface 16b of the rod cover 16 (in the direction of the arrow B) and does not penetrate through to the outer wall surface 16a.

In addition, in a state in which the one end of the cylinder tube 12 is placed in abutment against the inner wall surface 14b of the head cover 14 and the other end thereof is placed in abutment against the inner wall surface 16b of the rod cover 16, the connecting rods 88 are inserted respectively through the four first and second holes 26, 50, and fastening nuts 90 (see FIGS. 1, 3A and 3B) are screw-engaged on both ends thereof. Thereafter, the fastening nuts 90 are tightened until they come into abutment against the outer wall surfaces 14a, 16a of the head cover 14 and the rod cover 16. As a result, the cylinder tube 12 is fixed in a condition of being sandwiched and gripped between the head cover 14 and the rod cover 16.

Figure 5:
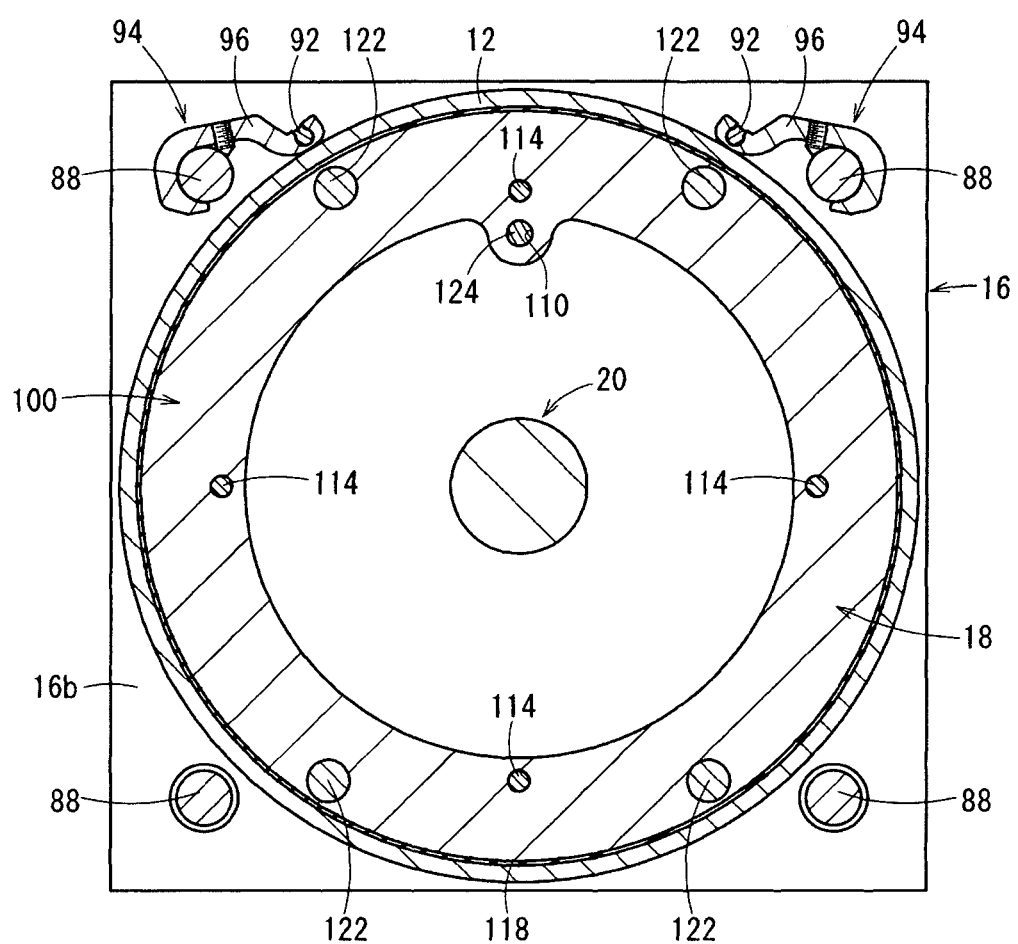
FIG. 5 is a cross-sectional view taken along line V-V of FIG. 1.

Further, as shown in FIG. 5, sensor retaining bodies 94 that hold detection sensors 92 for detecting the position of the piston unit 18 are disposed on the connecting rods 88.

The sensor retaining bodies 94 are disposed substantially perpendicular with respect to the direction of extension of the connecting rods 88, and are disposed so as to be capable of moving along the connecting rods 88, together with including mounting sections 96 that extend from the locations retained on the connecting rods 88 and in which the detection sensors 92 are mounted. In the mounting sections 96, grooves, which are circular in cross section, for example, are formed substantially in parallel with the connecting rods 88, with the detection sensors 92 being housed and retained in the grooves.

The detection sensors 92 are magnetic sensors (magnetic bodies) that are capable of detecting magnetism possessed by magnets 122 of a later-described ring body 100. The sensor retaining bodies 94 including the detection sensors 92 are selectively provided at a quantity as needed.

As shown in FIGS. 1, 2, 6, and 7, the piston unit 18 includes a disk shaped plate body 98, which is connected to one end of the piston rod 20, and the ring body 100 connected to an outer edge portion of the plate body 98.

The plate body 98, for example, is formed with a substantially constant thickness from a metal plate member having elasticity, and a plurality of (for example, four) second through holes 102 that penetrate therethrough in the thickness direction are disposed in a central portion of the plate body 98 (see FIGS. 1 and 2). In addition, second rivets 104 are inserted into the second through holes 102, and by distal ends thereof being inserted into and engaged with second rivet holes 106 that are formed in the one end of the piston rod 20, the plate body 98 is connected substantially perpendicular to the one end of the piston rod 20.

The second rivets 104, for example, similar to the first rivets 60, are self-drilling rivets. After the second rivets 104 are inserted such that the flange members 66 thereof are placed on the side of the head cover 14 (in the direction of the arrow B) of the plate body 98, by punching the pin members 68 into the interior of the piston rod 20, the pin members 68 are engaged with respect to the second rivet holes 106, and the plate body 98 is fixed in engagement with respect to the piston rod 20.

Further, on an outer edge portion of the plate body 98, a plurality of (for example, four) third through holes 108 are provided that penetrate in the thickness direction (see FIGS. 1 and 2). The third through holes 108 are formed at equal intervals mutually along the circumferential direction of the plate body 98, together with being formed on the same diameter with respect to the center of the plate body 98.

Furthermore, on the plate body 98, at a position more on an inner circumferential side than the third through holes 108, a rod insertion hole 110 is formed that penetrates in the thickness direction, and through which the later-described guide rod 124 is inserted.

Further still, on the plate body 98, at a position between the outer edge portion and the center portion that is fixed to the piston rod 20, for example, a rib 112 is included which has a curved shape in cross section. The rib 112 is formed in an annular shape along the circumferential direction, and is formed so as to project out toward an opposite side (in the direction of the arrow B) from the side of the piston rod 20. Further, the rib 112 may be formed to project out toward the side of the piston rod 20 (in the direction of the arrow A). Moreover, the rib 112 is formed at a position more on the inner circumferential side than the rod insertion hole 110.

By providing the rib 112, the degree of deflection of the elastic plate body 98 is set to a predetermined amount. Stated otherwise, by appropriately modifying the shape and position of the rib 112, the amount of deflection of the plate body 98 can be freely adjusted. Further, the aforementioned rib 112 need not necessarily be provided.

The plate body 98 is not limited to the case of being connected to the end of the piston rod 20 by the second rivets 104, and for example, the plate body 98 may be connected to the end of the piston rod 20 by caulking or welding, may be connected thereto by press-contact and adhesion, or may be connected by screw-insertion. Furthermore, the plate body 98 may be connected by press-fitting of a pin into the end of the piston rod 20 and plastic deformation of the end of the pin.

The ring body 100, for example, is formed with a circular shape in cross section from a metal material, and the outer edge portion of the plate body 98 is placed in abutment against an edge portion thereof on the side of the head cover 14 (in the direction of the arrow B), and is fixed thereto by a plurality of third rivets 114. The third rivets 114, for example, similar to the first and second rivets 60, 104, are self-drilling rivets. After the third rivets 114 are inserted such that the flange members 66 thereof are placed on the side of the head cover 14 (in the direction of the arrow B) of the plate body 98, by punching the pin members 68 into third rivet holes 115 of the ring body 100, the pin members 68 are engaged and latched in the interior thereof.

Further, as shown in FIG. 2, a piston packing 116 and a wear ring 118 are disposed on the ring body 100 through annular grooves that are formed on the outer circumferential surface thereof. In addition, by the piston packing 116 sliding in contact with the inner circumferential surface of the cylinder tube 12, leakage of pressure fluid through a gap between the ring body 100 and the cylinder tube 12 is prevented. Further, by the wear ring 118 sliding in contact with the inner circumferential surface of the cylinder tube 12, the ring body 100 is guided in the axial direction (the directions of arrows A and B) along the cylinder tube 12.

Furthermore, as shown in FIGS. 1, 2, 5, and 6, on a side surface of the ring body 100 facing toward the head cover 14, a plurality of (for example, four) holes 120, which are opened in the axial direction, are formed (see FIGS. 2 and 7), and cylindrical magnets 122 are press-fitted, respectively, into the interiors of the holes 120. The arrangement of the magnets 122 is such that, when the piston unit 18 is disposed in the interior of the cylinder tube 12, as shown in FIG. 5, the magnets 122 are disposed at positions facing toward the four connecting rods 88, and the magnetism of the magnets 122 is detected by the detection sensors 92 of the sensor retaining bodies 94 that are provided on the connecting rods 88.

As shown in FIGS. 1, 2, and 4A through 5, the guide rod 124 is formed as a shaft with a circular shape in cross section, with one end thereof being inserted into the first rod hole 46 of the head cover 14, and the other end thereof being inserted into the second rod hole 86 of the rod cover 16, together with being inserted through the rod insertion hole 110 of the plate body 98. Owing thereto, in the interior of the cylinder tube 12, the guide rod 124 is fixed to the head cover 14 and the rod cover 16 and is disposed in parallel with the axial direction (displacement direction) of the piston unit 18, together with the piston unit 18 being prevented from undergoing rotation when the piston unit 18 is displaced in the axial direction. Stated otherwise, the guide rod 124 functions as a rotation stop for the piston unit 18.

Further, an O-ring is disposed in the rod insertion hole 110, whereby leakage of pressure fluid through a gap between the guide rod 124 and the rod insertion hole 110 is prevented.

Figure 6:
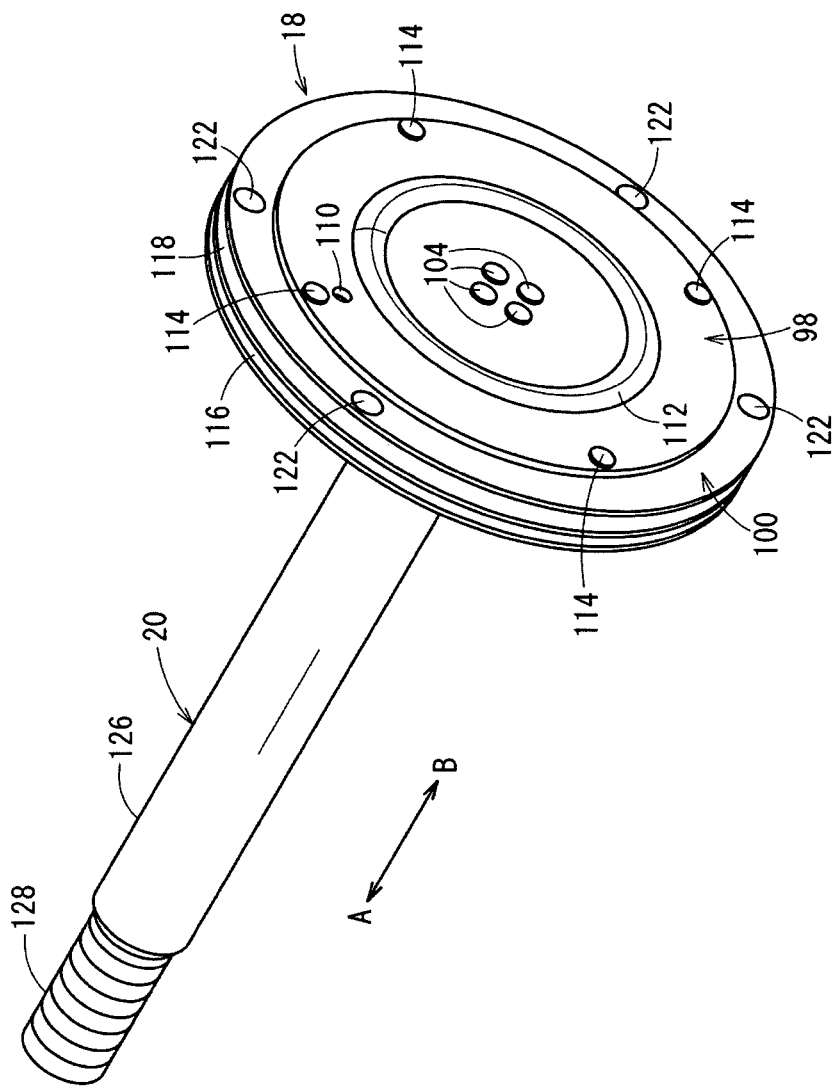
FIG. 6 is an exterior perspective view of a piston unit and a piston rod in the fluid pressure cylinder of FIG. 1.
Figure 7:
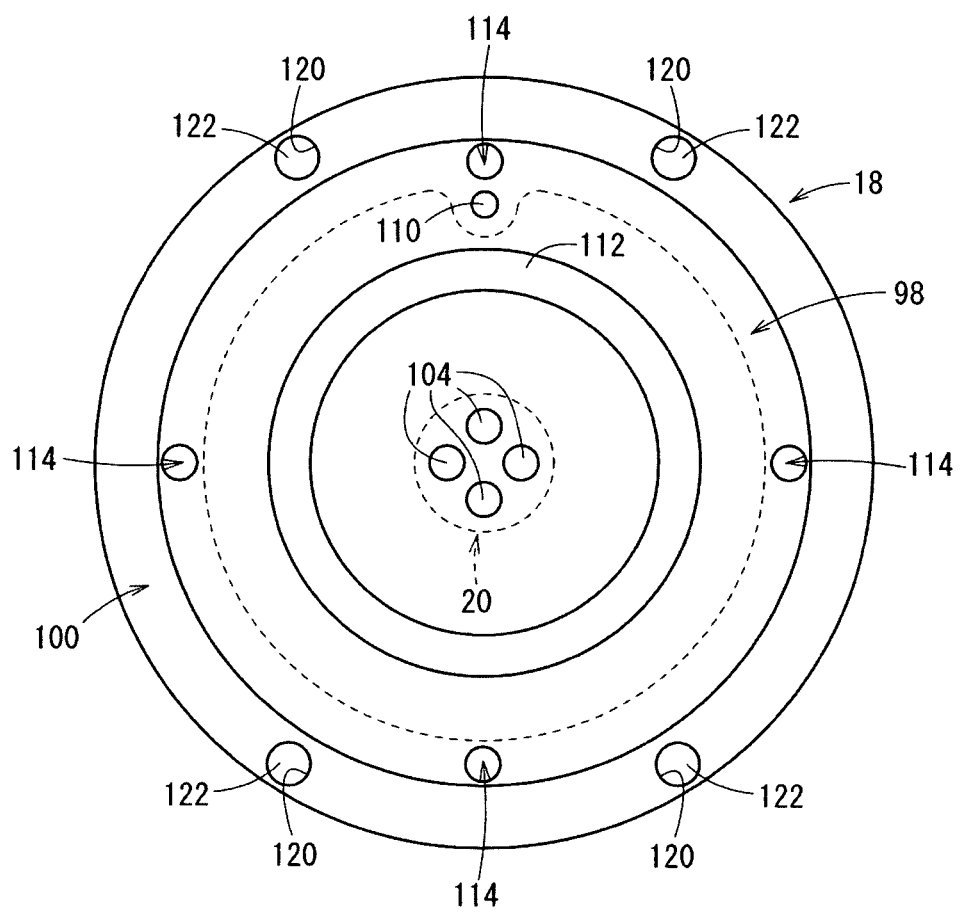
FIG. 7 is a front view of the piston unit shown in FIG. 6.

As shown in FIGS. 1 and 6, the piston rod 20 is made up from a shaft having a predetermined length along the axial direction (the directions of arrows A and B), and includes a main body portion 126 formed with a substantially constant diameter, and a small diameter distal end portion 128 formed on the other end of the main body portion 126. The distal end portion 128 is disposed so as to be exposed to the outside of the cylinder tube 12 through the holder 54. The one end of the main body portion 126 is formed in a substantially planar surface shape perpendicular to the axial direction of the piston rod 20, and is connected to the plate body 98.

The fluid pressure cylinder 10 according to the first embodiment of the present invention is constructed basically as described above. Next, operations and advantageous effects of the fluid pressure cylinder 10 will be described. A condition in which the piston unit 18 is displaced to the side of the head cover 14 (in the direction of the arrow B) will be described as an initial position.

At first, a pressure fluid is introduced to the first port member 30 from a non-illustrated pressure fluid supply source. In this case, the second port member 74 is placed in a state of being open to atmosphere under a switching operation of a non-illustrated switching valve. Consequently, the pressure fluid is supplied from the first port member 30 to the port passage 32 and the first communication hole 28, and by the pressure fluid that is introduced into the cylinder chamber 22a from the first communication hole 28, the piston unit 18 is pressed toward the side of the rod cover 16 (in the direction of the arrow A). In addition, the piston rod 20 is displaced while being guided in the holder 54 together with the piston unit 18, and by the end surface of the ring body 100 coming into abutment against the second damper 82, a displacement terminal end position is reached.

On the other hand, in the case that the piston unit 18 is to be displaced in the opposite direction (in the direction of the arrow B), together with the pressure fluid being supplied to the second port member 74, the first port member 30 is placed in a state of being open to atmosphere under a switching operation of the switching valve (not shown). In addition, the pressure fluid is supplied from the second port member 74, through the port passage 76 and the second communication hole 52, to the cylinder chamber 22b, and by the pressure fluid that is introduced into the cylinder chamber 22b, the piston unit 18 is pressed toward the side of the head cover 14 (in the direction of the arrow B).

In addition, the piston rod 20 is displaced while being guided in the holder 54 under the displacement action of the piston unit 18, and the initial position is restored by the ring body 100 of the piston unit 18 coming into abutment against the first damper 42 of the head cover 14.

Further, when the piston unit 18 is displaced along the cylinder tube 12 in the axial direction (the directions of arrows A and B) in the manner described above, by being displaced along the guide rod 124 that is inserted through the interior of the piston unit 18, rotational displacement thereof does not take place. Therefore, the magnets 122 that are provided in the piston unit 18 are kept in positions facing toward the detection sensors 92, and the displacement of the piston unit 18 can reliably be detected by the detection sensors 92.

In the foregoing manner, according to the first embodiment, in the piston unit 18 that constitutes the fluid pressure cylinder 10, the plural magnets 122 are accommodated in the interior of the ring body 100, and the magnets 122 are disposed at positions facing toward the four connecting rods 88. Together therewith, the guide rod 124, which is connected to the head cover 14 and the rod cover 16, is inserted through the interior of the ring body 100.

Consequently, rotational displacement of the piston unit 18 is prevented by the guide rod 124, and the magnets 122 are retained at all times in facing relation to the detection sensors 92. Therefore, the position of the piston unit 18 in the axial direction (the directions of arrows A and B) can be detected reliably by the detection sensors 92, while additionally, in comparison with the conventional fluid pressure cylinder in which a ring shaped magnet is provided so as to surround the outer circumferential surface of the piston, the amount of the magnets that are used can be reduced, the weight of the magnets can be reduced by such an amount, and the cost of the magnets can be reduced.

As a result, while the manufacturing costs for the fluid pressure cylinder 10 are reduced, it also is possible to reduce the weight of the fluid pressure cylinder 10.

Figure 8:
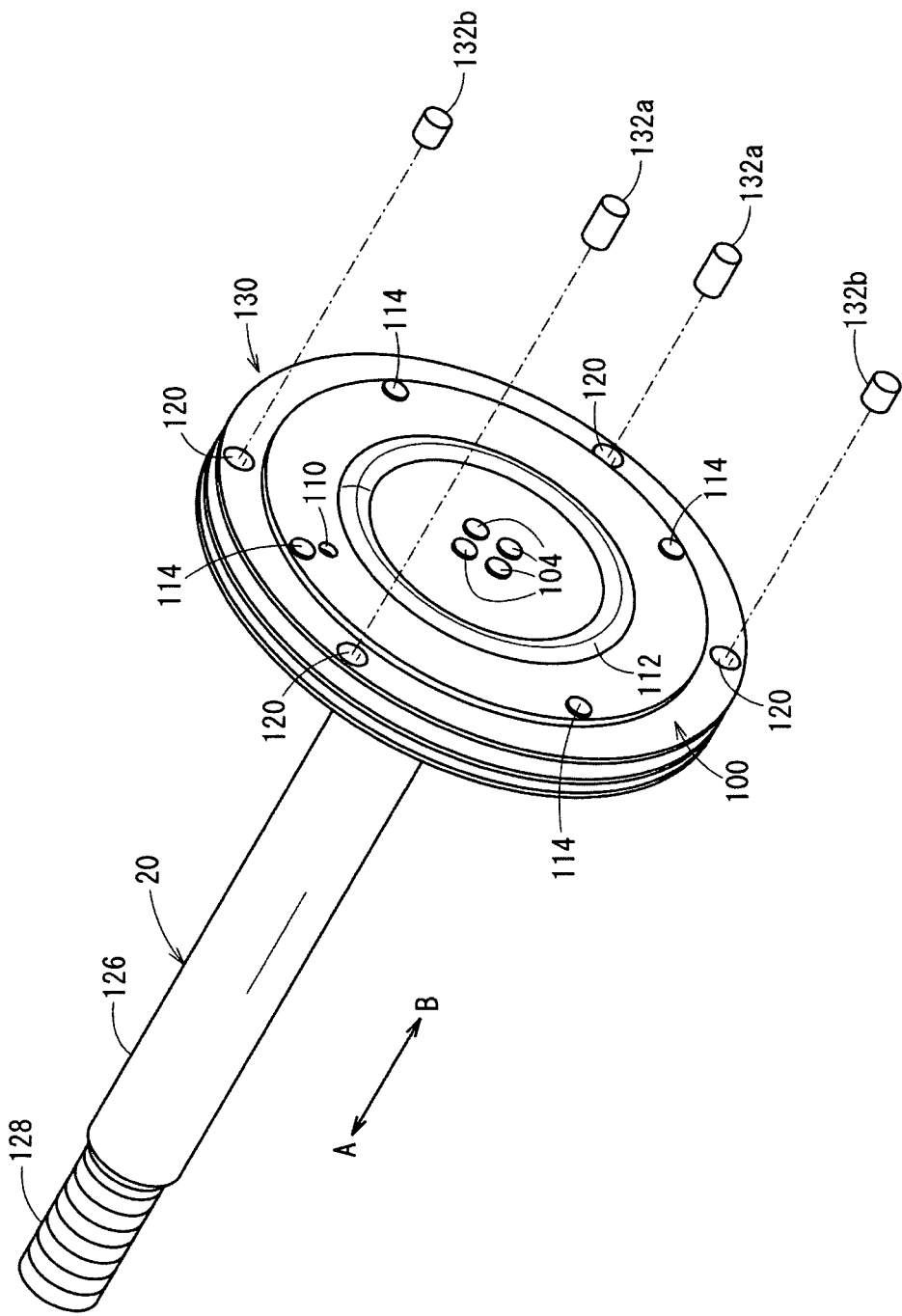
FIG. 8 is an exploded perspective view of the piston unit according to a modification.

Further, as in the magnets 122 mentioned above, the present invention is not limited to a case in which all of the magnets 122, which are provided in plurality, have the same dimensions. For example, as in a piston unit 130 shown in FIG. 8, magnets 132a, 132b having respective length dimensions that differ along the axial direction (the directions of arrows A and B) may be accommodated, and magnets having different magnetic characteristics may be provided.

In this manner, by configuring the plural magnets 132a, 132b so as to be capable of being accommodated in the piston unit 130, and providing beforehand in the ring body 100 the plural types of magnets 132a, 132b, which differ in the shapes and performance thereof, for example, in the case that the fluid pressure cylinder 10 is used in an atmosphere where there is a strong magnetic field, magnets of magnetic characteristics having a strong magnetic field are provided in advance, and even in such a strong magnetic field atmosphere, the magnets can be detected selectively by the detection sensors 92, and the position of the piston unit 130 can be detected reliably.

Further, for example, by setting the magnets 132a to have a long axial dimension, and enabling the magnets 132a to be detected by the detection sensors 92, when the piston unit 130 is displaced, the position of the piston unit 130 can be detected at a quicker stage than the ordinary detection position thereof.

Instead of accommodating the magnets 122, 132a, and 132b, iron pieces, which define magnetic bodies, may be accommodated. More specifically, it is acceptable if the magnetic bodies are capable of being detected by the detection sensors 92.

Next, a fluid pressure cylinder 150 according to a second embodiment will be described with reference to FIG. 9. Constituent elements thereof, which are the same as those of the fluid pressure cylinder 10 according to the aforementioned first embodiment, are designated by the same reference characters, and detailed description of such features is omitted.

The fluid pressure cylinder 150 according to the second embodiment differs from the fluid pressure cylinder 10 according to the first embodiment, in that it is a dual rod type of fluid pressure cylinder, in which the ends of a pair of piston rods 156a, 156b project out respectively from first and second end covers 152, 154 that are provided on both ends of the cylinder tube 12.

Figure 9:
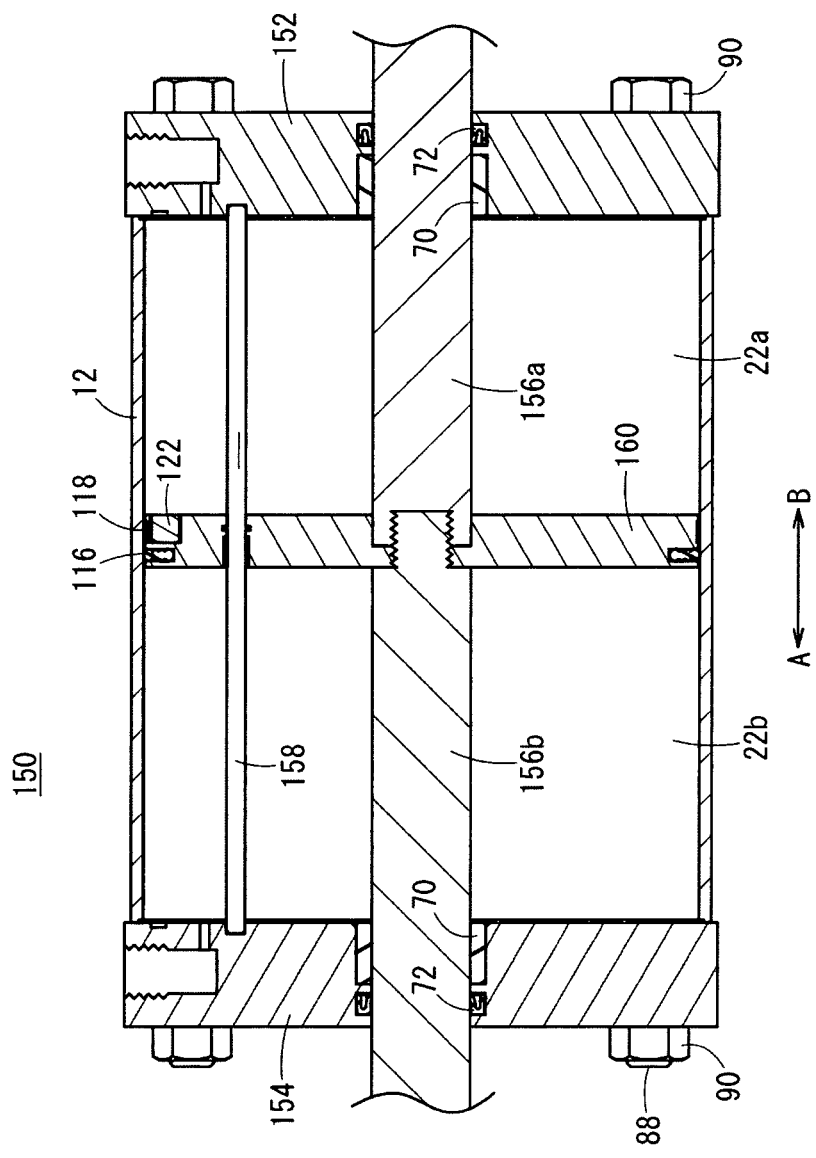
FIG. 9 is an overall cross-sectional view of a fluid pressure cylinder according to a second embodiment.

As shown in FIG. 9, the fluid pressure cylinder 150 is equipped with respective first and second end covers 152, 154, which are disposed on both ends of the cylinder tube 12. The first and second end covers 152, 154 are formed in substantially symmetrical shapes sandwiching the cylinder tube 12 therebetween. Both ends of guide rod 158 are retained on inner wall surfaces of the first and second end covers 152, 154.

Further, a piston 160 is disposed displaceably in the interior of the cylinder tube 12. The pair of piston rods 156a, 156b are connected to a center portion of the piston 160, and the guide rod 158 is inserted through the piston 160 at a position located more on a radial outer side than the center portion. The piston rods 156a, 156b are connected respectively to one side surface and another side surface of the piston 160.

In the foregoing manner, with the fluid pressure cylinder 150 according to the second embodiment, by providing the single guide rod 158 between the first end cover 152 and the second end cover 154, and having the guide rod 158 penetrate through the piston 160, rotational displacement of the piston 160 can reliably be restricted. As a result, compared to the case of providing a pair of guide rods in the same manner as the piston rods 156a, 156b, since rotation can be restricted by the single guide rod 158, the number of parts in the fluid pressure cylinder 150 can be reduced, together with enabling a reduction in the number of assembly steps.

Next, a fluid pressure cylinder 170 according to a third embodiment will be described with reference to FIG. 10. Constituent elements thereof, which are the same as those of the fluid pressure cylinders 10, 150 according to the aforementioned first and second embodiments, are designated by the same reference characters, and detailed description of such features is omitted.

The fluid pressure cylinder 170 according to the third embodiment differs from the fluid pressure cylinders 10, 150 according to the first and second embodiments, in that it is a tandem type of fluid pressure cylinder, in which a pair of first and second cylinder tubes 172, 174 are disposed coaxially, and a pair of first and second pistons 176, 178 are disposed displaceably in the interiors of the first and second cylinder tubes 172, 174.

Figure 10:
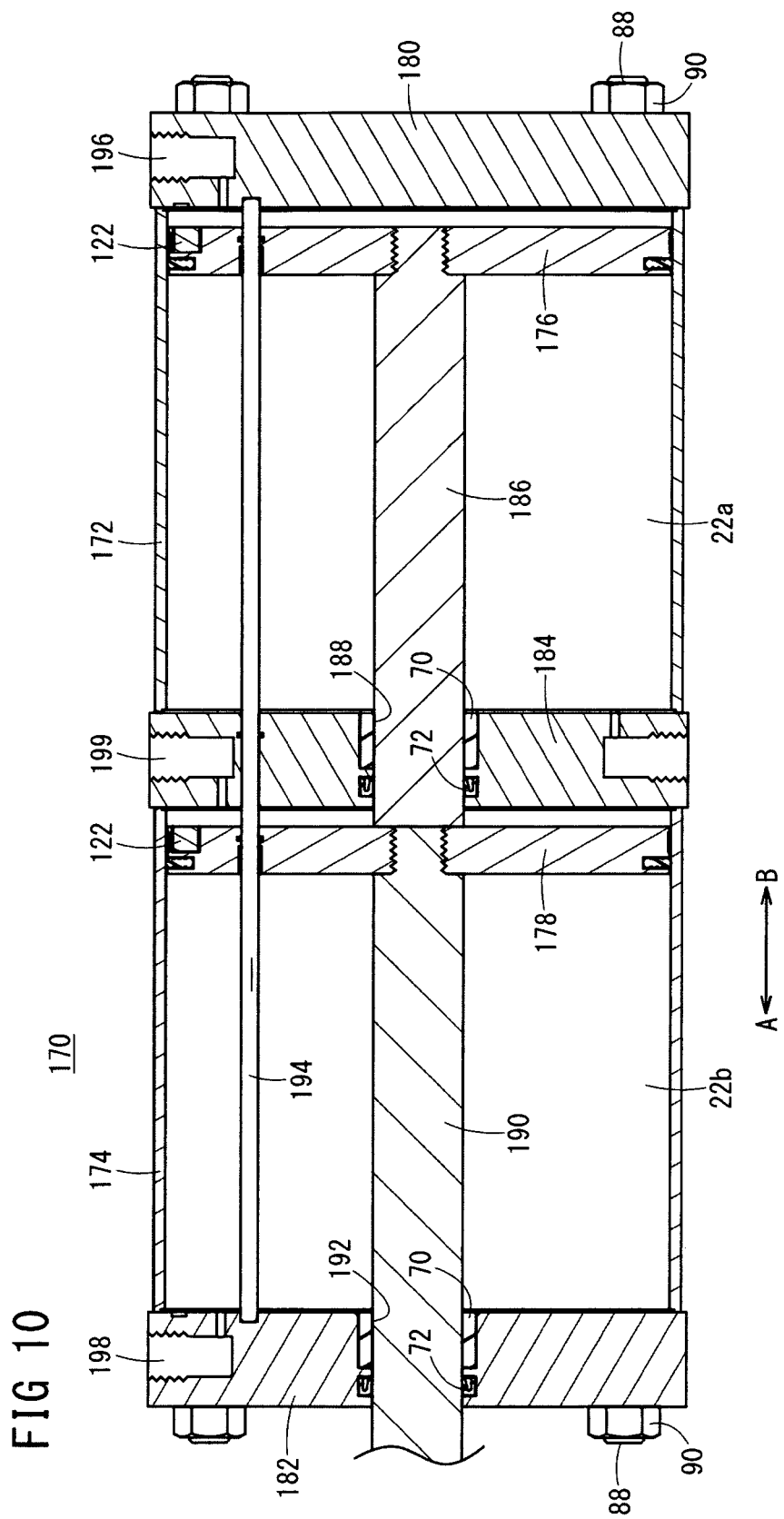
FIG. 10 is an overall cross-sectional view of a fluid pressure cylinder according to a third embodiment.

As shown in FIG. 10, the fluid pressure cylinder 170 is connected together integrally in a state in which an intermediate plate 184 is disposed between a head cover 180 and a rod cover 182, the first cylinder tube 172 is disposed between the head cover 180 and the intermediate plate 184, and the second cylinder tube 174 is disposed between the rod cover 182 and the intermediate plate 184.

Further, the first piston 176 and a first piston rod 186 are disposed displaceably in the interior of the first cylinder tube 172, and the other end of the first piston rod 186 is supported displaceably in a first rod hole 188 of the intermediate plate 184.

On the other hand, the second piston 178 and a second piston rod 190 are disposed displaceably in the interior of the second cylinder tube 174, and the other end of the second piston rod 190 is supported displaceably in a second rod hole 192 of the rod cover 182.

Further, a guide rod 194 is disposed between an inner wall surface of the head cover 180 and an inner wall surface of the rod cover 182, both ends of the guide rod 194 are retained by the head cover 180 and the rod cover 182, an intermediate region thereof is inserted through the intermediate plate 184, and moreover, the guide rod 194 is inserted through the interiors of the first and second pistons 176, 178. More specifically, the first and second pistons 176, 178 are displaced in the axial direction (the directions of arrows A and B) along the guide rod 194.

In addition, by supplying a pressure fluid from a first port 196 of the head cover 180 to the interior of the first cylinder tube 172, the first piston 176 and the first piston rod 186 are displaced toward the side of the rod cover 182 (in the direction of the arrow A), and the second piston 178 is pushed by the other end of the first piston rod 186 and displaced integrally.

Further, without supplying pressure fluid to the first port 196, by supplying pressure fluid to an intermediate port 199 of the intermediate plate 184, only the second piston 178 is capable of being displaced by the pressure fluid that is supplied to the interior of the second cylinder tube 174.

On the other hand, by supplying a pressure fluid from a second port 198 of the rod cover 182 to the interior of the second cylinder tube 174, the second piston 178 is displaced toward the side of the intermediate plate 184 (in the direction of the arrow B), and the other end of the first piston rod 186 is pushed, whereby the first piston 176 also is displaced integrally to the side of the head cover 180 (in the direction of the arrow B).

In this case, by the first and second pistons 176, 178 being displaced along the guide rod 194, rotational displacement thereof does not occur, and the magnets 122 that are mounted in the first and second pistons 176, 178 are positioned at all times in facing relation to the detection sensors 92, whereby the displacement positions of the first and second pistons 176, 178 can be detected reliably by the detection sensors 92.

In the foregoing manner, with the fluid pressure cylinder 170 according to the third embodiment, the single guide rod 194 is disposed along the interiors of the coaxially disposed first and second cylinder tubes 172, 174, and the guide rod 194 is inserted through the interiors of the first and second pistons 176, 178. Accordingly, in comparison with a case in which respective guide rods are disposed for each of the pair of first and second cylinder tubes 172, 174, since rotation of the first and second pistons 176, 178 can be restricted by the single guide rod 194, the number of parts in the fluid pressure cylinder 170 can be reduced, together with enabling a reduction in the number of assembly steps.

Next, a fluid pressure cylinder 200 according to a fourth embodiment will be described with reference to FIG. 11.

Constituent elements thereof, which are the same as those of the fluid pressure cylinders 10, 150, 170 according to the aforementioned first through third embodiments, are designated by the same reference characters, and detailed description of such features is omitted.

Figure 11:
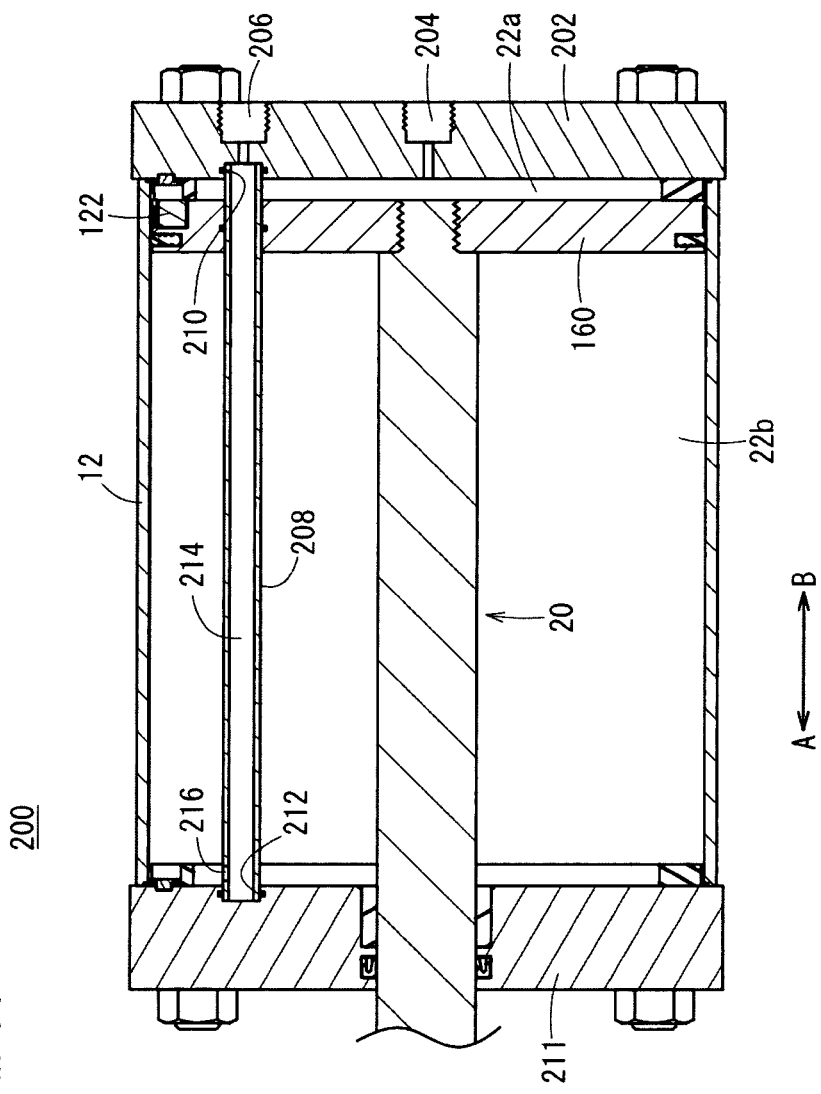
FIG. 11 is an overall cross-sectional view of a fluid pressure cylinder according to a fourth embodiment.

As shown in FIG. 11, the fluid pressure cylinder 200 according to the fourth embodiment differs from the fluid pressure cylinders 10, 150, 170 according to the first through third embodiments, in that first and second ports 204, 206 are included in a head cover 202.

On the head cover 202, there are included the first port 204, which opens in the center of an outer wall surface thereof, and the second port 206, which opens in the vicinity of an outer edge portion of the outer wall surface. The first and second ports 204, 206 are formed substantially in parallel and penetrate in the thickness direction of the head cover 202. Stated otherwise, the first and second ports 204, 206 are formed along the axial direction (the directions of arrows A and B) of the fluid pressure cylinder 200.

Further, on the inner wall surface of the head cover 202, a first rod hole 210 is formed in which one end of a guide rod 208 is retained, and the first rod hole 210 communicates with the second port 206.

On the other hand, on the inner wall surface of a rod cover 211, a second rod hole 212 is formed in which the other end of the guide rod 208 is retained. The guide rod 208 is of a hollow shape including a space 214 in the interior thereof, and is formed in a straight line shape along the axial direction (the directions of arrows A and B).

In addition, by the one end of the guide rod 208 being inserted into the first rod hole 210, the space 214 in the interior of the guide rod 208 communicates with the second port 206, and through a communication port 216 that opens on the outer circumferential surface of the guide rod 208, communication between the interior space 214 and the cylinder chamber 22*b* of the cylinder tube 12 is established.

Further, the guide rod 208 is inserted through the interior of the piston 160, and serves to guide the piston 160 displaceably along the axial direction (the directions of arrows A and B).

In the foregoing manner, with the fluid pressure cylinder 200 according to the fourth embodiment, the guide rod 208, which restricts rotational displacement and guides the piston 160 along the axial direction, is formed in a hollow shape, and the space 214 in the interior thereof is used as a passage for supplying a pressure fluid, which is supplied from the second port 206 into the cylinder chamber 22*b* between the piston 160 and the rod cover 211. Thus, the guide rod 208 can be equipped in a dual manner as a member for restricting rotation of the piston 160, as well as a means for supplying the pressure fluid.

As a result, compared to the case of respectively providing separately the member for restricting rotation of the piston 160 and the means for supplying the pressure fluid, the structure of the fluid pressure cylinder 200 can be simplified, and along therewith, manufacturing costs can be reduced, together with enabling a reduction in the number of assembly steps.

Figure 12A:
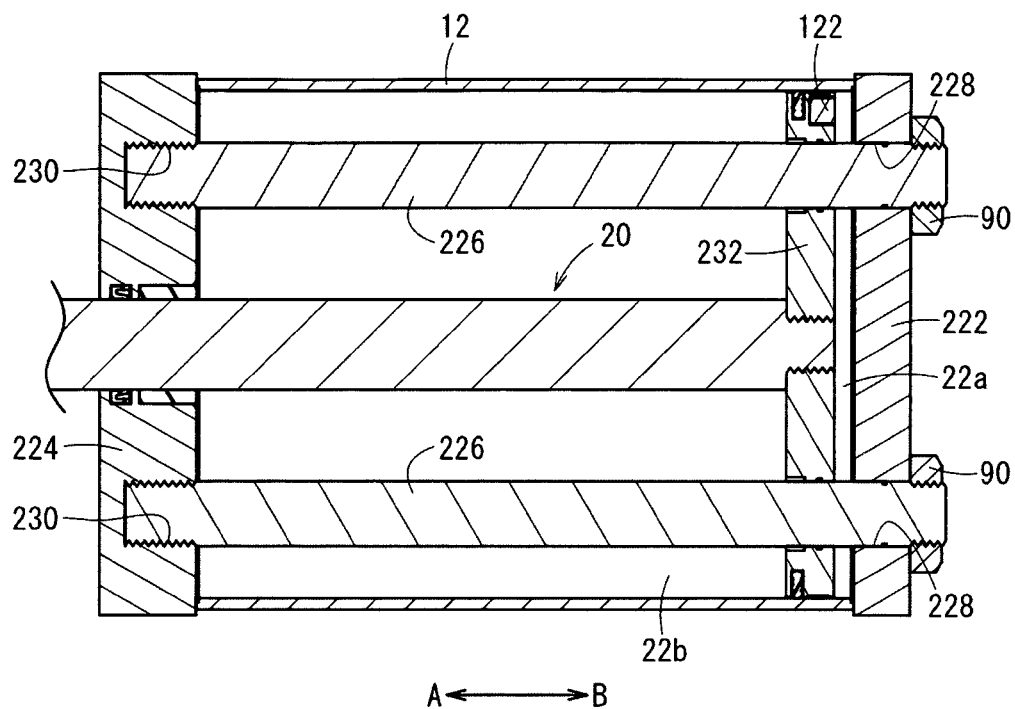
FIG. 12A is an overall cross sectional view of a fluid pressure cylinder according to a fifth embodiment.
Figure 12B:
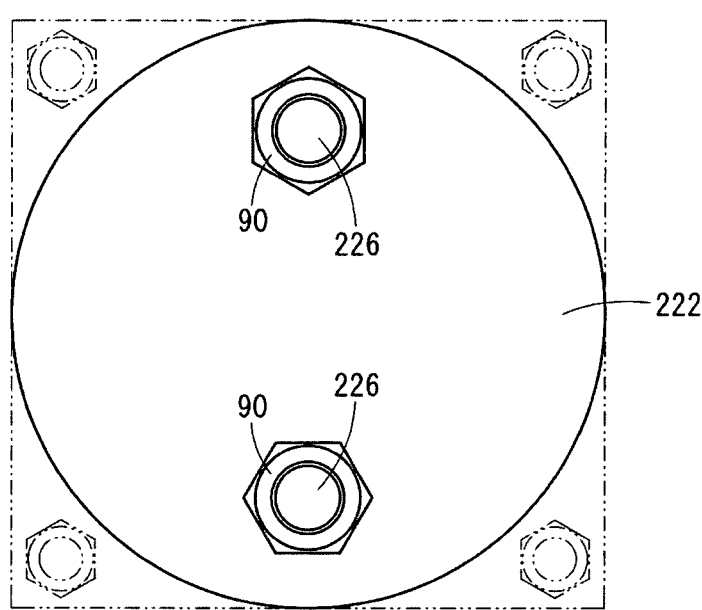
FIG. 12B is a front view as seen from a side of a head cover in the fluid pressure cylinder shown in FIG. 12A.

Next, a fluid pressure cylinder 220 according to a fifth embodiment will be described with reference to FIGS. 12A and 12B. Constituent elements thereof, which are the same as those of the fluid pressure cylinders 10, 150, 170, 200 according to the aforementioned first through fourth embodiments, are designated by the same reference characters, and detailed description of such features is omitted.

The fluid pressure cylinder 220 according to the fifth embodiment differs from the fluid pressure cylinders 10, 150, 170, 200 according to the first through fourth embodiments, in that plural connecting rods 226, which connect a head cover 222 and a rod cover 224 while sandwiching the cylinder tube 12 therebetween, are disposed in such a manner that they are inserted through the interior of the cylinder tube 12.

The two connecting rods 226 are provided, for example, which are inserted through insertion holes 228 that penetrate through the head cover 222, and after being inserted into the interior of the cylinder tube 12, the other ends of the connecting rods 226 are connected by screw-engagement thereof with respect to threaded holes 230 of the rod cover 224.

In addition, by screw-engagement and tightening of the fastening nuts 90 with respect to ends of the connecting rods 226 that project outside of the head cover 222, the cylinder tube 12 is fixed in a state of being sandwiched and gripped by the head cover 222 and the rod cover 224.

Further, in the interior of the cylinder tube 12, the connecting rods 226 are inserted through the interior of a piston 232, whereby rotational displacement of the piston 232 is restricted.

In this manner, with the fluid pressure cylinder 220 according to the fifth embodiment, a configuration is provided in which the plural connecting rods 226 are provided for fastening the head cover 222, the cylinder tube 12, and the rod cover 224 in the axial direction, and the connecting rods 226 are disposed in the interior of the cylinder tube 12, and further, are inserted through the interior of the piston 232.

Consequently, rotational displacement of the piston 232 can be restricted by utilizing the connecting rods 226, while additionally, compared to the case of arranging the connecting rods 226 on the outer side of the cylinder tube 12 (the shape shown by the two-dot-dashed line in FIG. 12B), it becomes possible for the cross-sectional shape perpendicular to the axial direction of the fluid pressure cylinder 220 to be made smaller in size, together with enabling a reduction in weight.

Next, a fluid pressure cylinder 240 according to a sixth embodiment will be described with reference to FIGS. 13A and 13B. Constituent elements thereof, which are the same as those of the fluid pressure cylinders 10, 150, 170, 200, 220 according to the aforementioned first through fifth embodiments, are designated by the same reference characters, and detailed description of such features is omitted.

The fluid pressure cylinder 240 according to the sixth embodiment differs from the fluid pressure cylinders 10, 150, 170, 200, 220 according to the first through fifth embodiments, in that first flat portions (fitting members) 244 are disposed on the outer circumferential surface of a piston rod 242, which by being placed in engagement with respect to a rod hole (fitting hole) 248 of a rod cover 246, serve to restrict rotational displacement of a piston 250, instead of providing a guide rod.

Figure 13A:
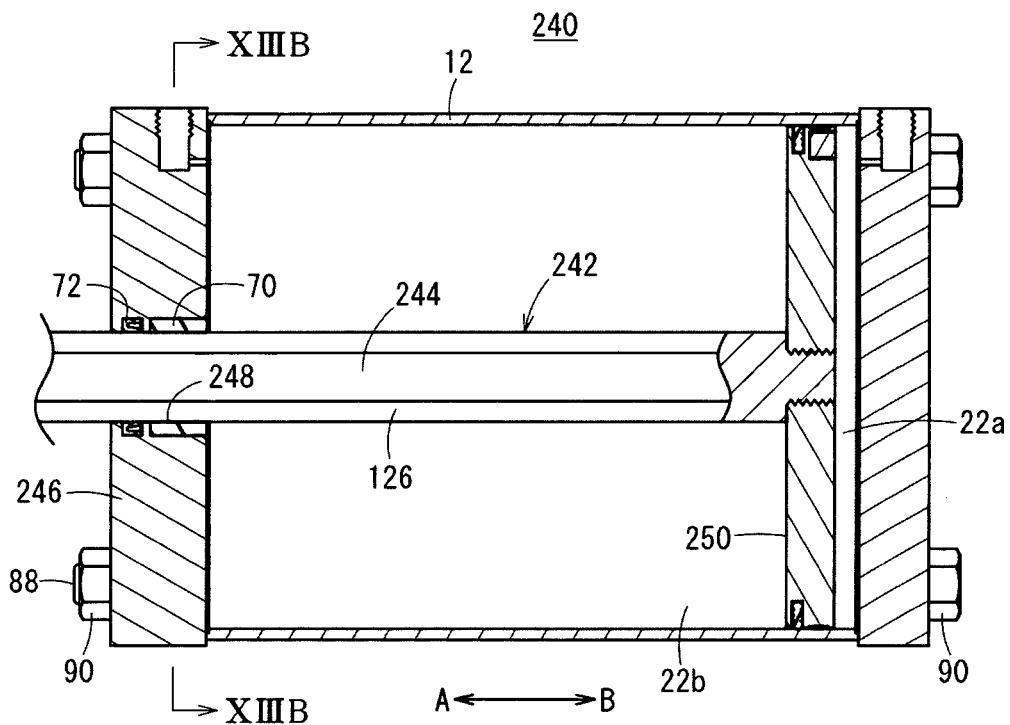
FIG. 13A is an overall cross sectional view of a fluid pressure cylinder according to a sixth embodiment.
Figure 13B:
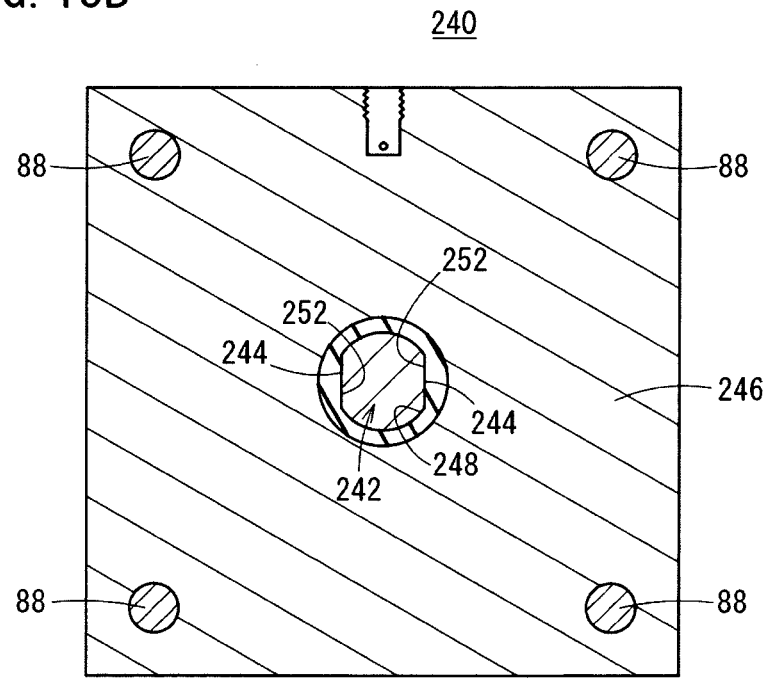
FIG. 13B is a cross-sectional view taken along line XIIIB-XIIIB of FIG. 13A.

In the fluid pressure cylinder 240, as shown in FIGS. 13A and 13B, the pair of first flat portions 244 are formed, in which portions of the outer circumferential surface are cutaway in flat shapes on the piston rod 242, and the first flat portions 244 extend in the axial direction (the directions of arrows A and B) along the main body portion 126 of the piston rod 242.

As shown in FIG. 13B, in the rod cover 246, the inner circumferential surface of the rod hole 248 through which the piston rod 242 is inserted is formed with a cross-sectional shape corresponding to the cross-sectional shape of the piston rod 242, and includes a pair of second flat portions 252 that face toward the first flat portions 244.

In addition, by insertion of the other end of the piston rod 242 through the rod hole 248, and arranging the first flat portions 244 and the second flat portions 252 so as to face one another, rotation of the piston rod 242 in the rod hole 248 is restricted.

In the foregoing manner, with the fluid pressure cylinder 240 according to the sixth embodiment, a guide rod is not disposed in the interior of the cylinder tube 12, and by machining the first and second flat portions 244, 252, respectively, in flat shapes on the outer circumferential surface of the piston rod 242 and on the inner circumferential surface of the rod hole 248, rotational displacement of the piston 250 can be restricted through the piston rod 242.

As a result, compared to the case of performing restriction to rotation using a guide rod, the number of parts of the fluid pressure cylinder 240 can further be reduced, together with enabling a reduction in the number of assembly steps.

The fluid pressure cylinder according to the present invention is not limited to the above embodiments. Various changes and modifications may be made to the embodiments without departing from the scope of the invention as set forth in the appended claims.

The invention claimed is:

1. A fluid pressure cylinder comprising:
    a cylinder tube including a cylinder chamber defined in interior thereof;
    cover members attached to opposite axial ends of the cylinder tube;
    an external rod provided externally of the cylinder tube and connecting the cover members such that cylinder tube is gripped between the cover members;
    a detection sensor provided on the external rod;
    a piston disposed displaceably along the cylinder chamber;
    a magnetic body disposed at a predetermined location along a circumferential direction of the piston; and
    a rotation restricting member configured to restrict rotational displacement of the piston;
    wherein the magnetic body is disposed at a circumferential position facing toward the detection sensor,
    wherein the magnetic body comprises a plurality of magnets of different magnetic characteristics.

2. The fluid pressure cylinder according to claim 1, wherein the rotation restricting member comprises an internal rod disposed in the interior of the cylinder tube, and inserted through the piston.

3. The fluid pressure cylinder according to claim 2, wherein the internal rod is a connecting rod configured to connect the cover members.

4. The fluid pressure cylinder according to claim 1, wherein the rotation restricting member comprises:
    a fitting member formed on an outer circumferential surface of a piston rod that is connected to the piston; and
    a fitting hole formed in the cover member and through which the fitting member is inserted.

5. The fluid pressure cylinder according to claim 1, further comprising a plurality of said external rods spaced about the circumference of the cylinder tube, wherein the magnetic body comprises a plurality of magnets arranged circumferentially at positions corresponding to detection sensors provided on the respective external rods.

6. The fluid pressure cylinder according to claim 5, wherein the detection sensors are respectively mounted on the external rods so as to be able to be selectively positionable along the length of the rods.

7. The fluid pressure cylinder according to claim 1, wherein the detection sensor is mounted on the external rod so as to be able to be selectively positionable along the length of the rod.

* * * * *